(12) United States Patent
Horibe

(10) Patent No.: US 7,522,747 B2
(45) Date of Patent: Apr. 21, 2009

(54) VEHICLE DETECTION APPARATUS AND METHOD

(75) Inventor: Koji Horibe, Kasugai (JP)

(73) Assignee: OMRON Corporation, Kyoto (JP)

( * ) Notice: Subject to any disclaimer, the term of this patent is extended or adjusted under 35 U.S.C. 154(b) by 250 days.

(21) Appl. No.: 11/050,043

(22) Filed: Feb. 1, 2005

(65) Prior Publication Data
US 2005/0213794 A1 Sep. 29, 2005

(30) Foreign Application Priority Data
Mar. 26, 2004 (JP) .............................. 2004-093614

(51) Int. Cl.
*G06K 9/00* (2006.01)
*G06K 9/62* (2006.01)
*G06K 9/60* (2006.01)
*G01S 13/00* (2006.01)

(52) U.S. Cl. ....................... 382/104; 382/209; 382/217; 382/305; 342/70; 342/118; 342/357.01

(58) Field of Classification Search ......... 382/103–107, 382/100, 209, 217–222, 305–306; 342/70, 342/118, 357.01
See application file for complete search history.

(56) References Cited

U.S. PATENT DOCUMENTS

| | | | | |
|---|---|---|---|---|
| 6,590,521 | B1 * | 7/2003 | Saka et al. ..................... | 342/70 |
| 6,768,944 | B2 * | 7/2004 | Breed et al. ................... | 701/301 |
| 7,049,945 | B2 * | 5/2006 | Breed et al. ................... | 340/435 |
| 7,133,537 | B1 * | 11/2006 | Reid ............................ | 382/103 |
| 2004/0054473 | A1 * | 3/2004 | Shimomura ................... | 701/301 |

FOREIGN PATENT DOCUMENTS

JP 2002-117392 4/2002

OTHER PUBLICATIONS

Development of a vision-based vehicle detection and recognition system for ntelligent vehicles, B. Ran and H.X. Liu, TRB Annual Meeting, Jan. 10-14, 1999, Washington, DC.*

* cited by examiner

*Primary Examiner*—Matthew C Bella
*Assistant Examiner*—Manav Seth
(74) *Attorney, Agent, or Firm*—Weaver Austin Villeneuve & Sampson LLP

(57) ABSTRACT

A front-going vehicle is recognized by using a camera image from a camera for monitoring the front of one's own vehicle and detection data from a radar for detecting position of an object in front of one's own vehicle and distance to this object. A front-going vehicle is recognized among photographed objects with object images contained in the camera image by extracting images in a specified area inside the camera image centered around positions of objects in detection data from the radar, binarizing the extracted images, matching patterns between an image figure contained in the binarized image and reference images and judging an image figure as a figure of a front-going vehicle if it is concluded that this image figure matches one of the reference images over a specified percentage. The reference figures are of a specified pattern, having a horizontally elongated part with downward protrusions from both its end parts so as to resemble a back view of a vehicle.

4 Claims, 12 Drawing Sheets

VEHICLE DETECTION APPARATUS AND METHOD

Priority is claimed on Japanese Patent Application 2004-093614 filed Mar. 26, 2004.

BACKGROUND OF THE INVENTION

This invention is in the technical field of detection of a vehicle. In particular, this invention relates to an apparatus for and a method of detecting an object in front of one's own vehicle and recognizing it as a vehicle, capable of identifying an object as a vehicle with a high level of accuracy without being confused by other objects of various kinds that may be present. Such an apparatus and a method may be applied to a cruise control system, contributing significantly to its reliability.

As disclosed in Japanese Patent Publication Koho 3,264,060, for example, there have been known vehicle control systems adapted to carry out an image processing operation on an image of conditions in front of one's own vehicle by means of a camera so as to recognize a front-going vehicle and to control the engine output for operating the vehicle so as to trail this front-going vehicle. Since the image taken by the camera includes various background images in addition to that of the front-running vehicle, it is required to correctly recognize only a desired object (or the front-running vehicle) out of all these background images.

In view of this requirement, aforementioned Japanese Patent Publication Koho 3,264,060 discloses a method of initially transmitting a laser beam from a laser radar in a forward direction while scanning within a horizontal plane, receiving reflected laser beam at the same time to thereby obtain position data of an object in front of one's own vehicle, next using an image processor to make a "processing area" within the image narrower for an object at a greater distance corresponding to the position coordinate of the object detected by the laser radar, shifting the processing area to the left or to the right as the position of the object is displaced in the direction of the width of one's own vehicle, and recognizing a front-going vehicle by carrying out image processing on the image of the processing area.

According to this method, in summary, the existence of an object in front is recognized first from a reflected laser beam of the laser radar and the focus of attention on the image obtained by the camera (referred to as the "processing area") is narrowed according to the result of recognition by the laser radar (the position of the object) such that only the image of this small area where the existence of a front-going vehicle is considered probable is processed without being confused by unnecessary background images such that only the desired target object (the front-going vehicle) can be correctly recognized.

By this prior art method, since a narrowed processing area is selected according to a result of recognition by the laser radar and only the image in this narrowed processing area is processed, it may be hoped that a front-going vehicle can be thereby recognized more accurately without being confused by the various background images. For reasons to be described below, however, this prior art method has a room for improvement regarding its accuracy of recognition.

According to the method of aforementioned Japanese Patent Publication Koho 3,264,060, areas surrounded by vertical lines are extracted from an image taken by a camera and the area having a symmetrical image in the left-right direction which does not move significantly from one to the next of images that are sequentially taken in is recognized as containing the image of a front-going vehicle. This criterion, and in particular the criterion related to symmetry, is too rough and hence there is a high probability that an object other than a vehicle may be erroneously recognized as a vehicle.

Consider a situation where one's own vehicle is traveling in the lane on the farthest left-hand side and there is another vehicle running in front at about the same speed in the next lane on the right-hand side. In this situation, this vehicle in a different lane cannot be an object of trailing. If the road makes a sharp curve to the left, the vehicle in the neighboring lane may show its side view almost exact in front of the own vehicle. In other words, the vehicle in a different lane may come to satisfy the condition according to this prior art technology for being a front-going vehicle that may be trailed because many vehicles are nearly symmetrically shaped when viewed from one side. Such a situation is likely to adversely affect the reliability of such an apparatus.

SUMMARY OF THE INVENTION

It is therefore an object of this invention to provide a reliable apparatus and method for recognizing a vehicle in an image of the front of one's own vehicle taken by a camera.

A vehicle detection apparatus according to this invention for using a camera image from a camera for monitoring the front of one's own vehicle and detection data from a radar for detecting the position of an object in front of one's own vehicle and the distance to this object to thereby recognize a front-going vehicle among other photographed objects with object images contained in the camera image is characterized as comprising image extracting means for extracting images in a specified area inside the camera image centered around the positions of objects in the detection data from the radar, binarization means for binarizing the extracted images by the image extracting means, matching means for matching patterns between an image figure contained in the binarized image and reference images having a horizontally elongated part with downward protrusions from both its end parts, and judging means for judging an image figure as a figure of a front-going vehicle if the matching means concludes that this image figure matches one of the reference images over a specified percentage.

According to a preferred embodiment of the invention, those of the reference figures corresponding to longer distances from one's own vehicle are made smaller.

A method according to this invention of using a camera image from a camera for monitoring the front of one's own vehicle and detection data from a radar for detecting the position of an object in front of one's own vehicle and the distance to this object from one's own vehicle to recognize a front-going vehicle among other photographed objects with object images contained in the camera image is characterized as comprising the steps of extracting images in a specified area inside the camera image centered around positions of objects in detection data from the radar, binarizing the extracted images, matching patterns between an image figure contained in the binarized image and reference images having a horizontally elongated part with downward protrusions from both its end parts, and judging an image figure as a figure of a front-going vehicle if it is concluded by the step of matching that this image figure matches one of the reference images over a specified percentage.

According to a preferred embodiment of the invention, those of the reference figures corresponding to longer distances from one's own vehicle are made smaller.

In this invention, it is noted that the front-going vehicle, when seen from behind, generally appears to be of a shape that can be approximated by an horizontally elongated figure with downward protrusions from its both side end parts, representing its wheels on the left-hand and right-hand sides, and this simplified figure is used as reference figures to carry out a pattern matching process such that a front-going vehicle can be recognized with an improved accuracy.

DETAILED DESCRIPTION OF THE INVENTION

The invention is explained next by way of examples with reference to the drawings but it goes without saying that the examples are not intended to limit the scope of the invention.

Figure 1A:
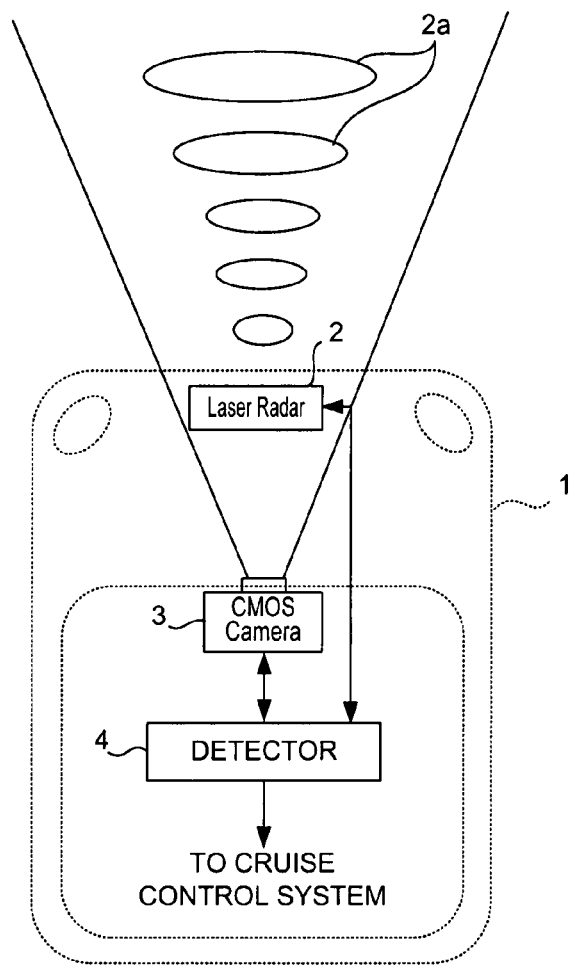
FIG. 1A is a structural diagram of a system embodying this invention and FIG. 1B is a conceptual diagram of random access of a CMOS camera.

FIG. 1A shows the structure of a system embodying this invention, comprising a vehicle (hereinafter referred to as one's own vehicle or just as the own vehicle) 1 provided with a laser radar 2, a CMOS camera 3 and a detector 4 serving as image-taking means, binarization means, matching means and judging means.

The laser radar 2 is adapted to evenly scan a fixed or variable monitoring area in front of the own vehicle 1 with a pencil-like laser beam 2a both horizontally and vertically and to obtain not only the position (direction and elevation angle) of an object from the horizontal and vertical angles of the scan angle of the beam when a reflected wave is received but also the distance to the object from the time delay of the reception of the reflected wave from the time of transmission of the beam. The radar need not be a laser radar but may use ordinary wireless waves such as a millimeter wave radar. What is essential is merely that it be a distance-measuring apparatus using electromagnetic waves to measure the position of and distance to an object within a monitoring area.

The CMOS camera 3 is adapted to obtain an optical image of a monitoring area (the same as or including the monitoring area of the laser radar 2) set in front of the own vehicle 1 and to output its image signal, having at least the same capability satisfying the dynamic range required for outdoor photography (100 dB or above) and provided with the so-called random access capability to an image in any area which means the capability of taking out only the image within a specified range of addresses as addresses within the specified range (column addresses and row addresses) of its effective pixels that are specified.

Figure 1B:
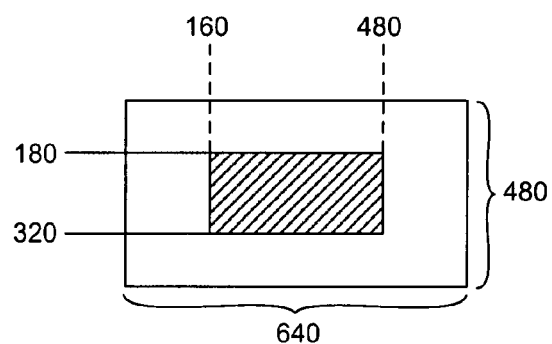

FIG. 1B is a conceptual diagram of the random access by a CMOS camera. In this example, effective pixels are arranged in 640 rows and 480 columns. If column addresses in the range of 160-320 and row addresses in the range of 160-480 are specified as readout addresses, it is possible to take out only the hatched portion of the total image (640×480) nearly at the center. This random access (selective readout of image in a specified area) is a characteristic of a CMOS camera, not shared by a CCD (charge-coupled device) camera.

The detector 4 is adapted to process image signals outputted from the CMOS camera 3 according to a specified algorithm, details of which will be explained below. In summary, it is for controlling the random access of the CMOS camera 3 so as to recognize a front-going vehicle in the image signals within the accessed range and to output the result of recognition to a cruise control system.

Figure 2:
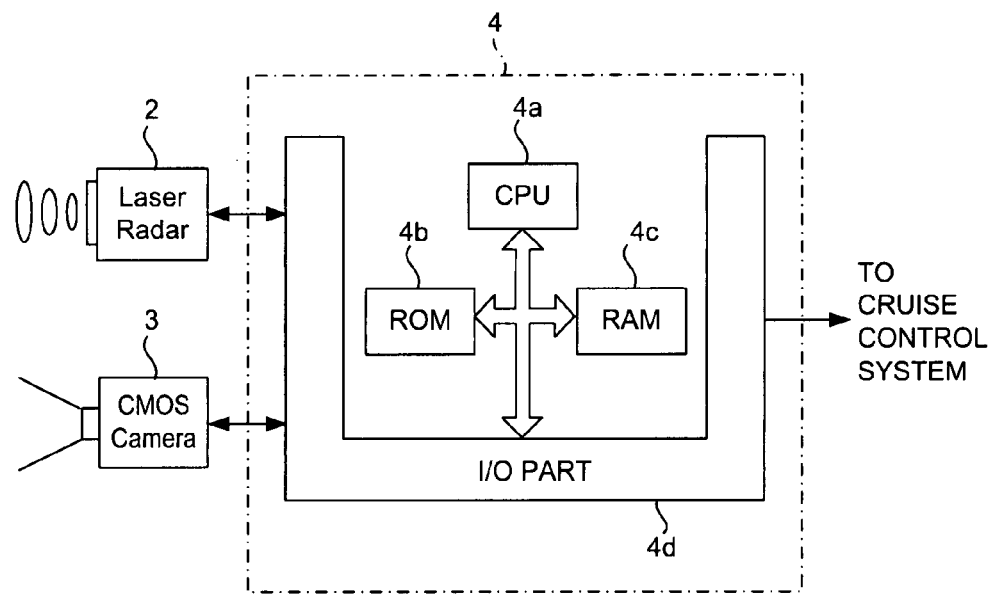
FIG. 2 is a conceptual structural diagram of the detector 4.

FIG. 2 is a conceptual structural diagram of the detector 4. According to this illustrated example which is not intended to limit the scope of the invention, the detector 4 comprises a CPU 4a, a ROM 4b, a RAM 4c and an input-output part 4d, being of a micro-program control type. Thus structured, the detector 4 serves to load its software resources such as a control program preliminarily stored in the ROM 4b on the RAM 4c and causes the CPU 4a to carry it out such that its intended function is utilized by an organic combination of its software resources with its hardware resources such as the CPU 4a. A reference figure table to be explained below (shown at 28 in FIG. 10) is also stored in the ROM 4b together with the aforementioned software resources.

Figure 6A:
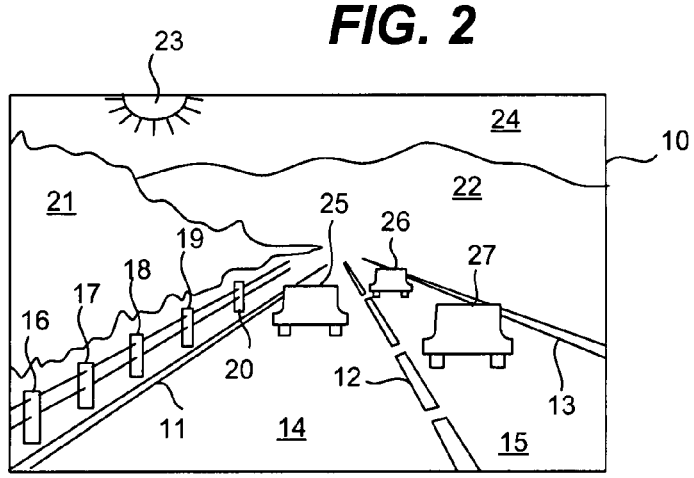
FIGS. 6A and 6B are drawings for showing examples of image data of the CMOS camera and detection data of the laser radar.
Figure 6B:
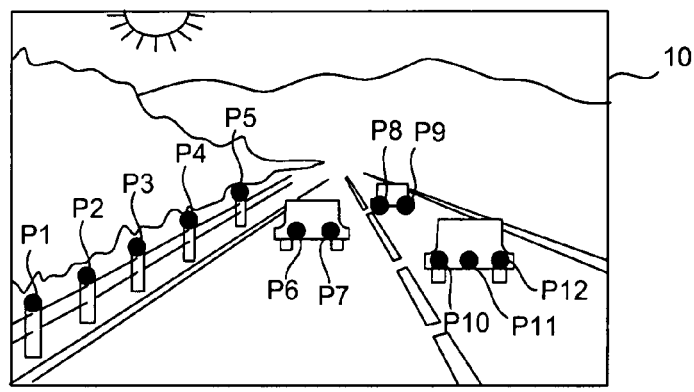
Figure 3:
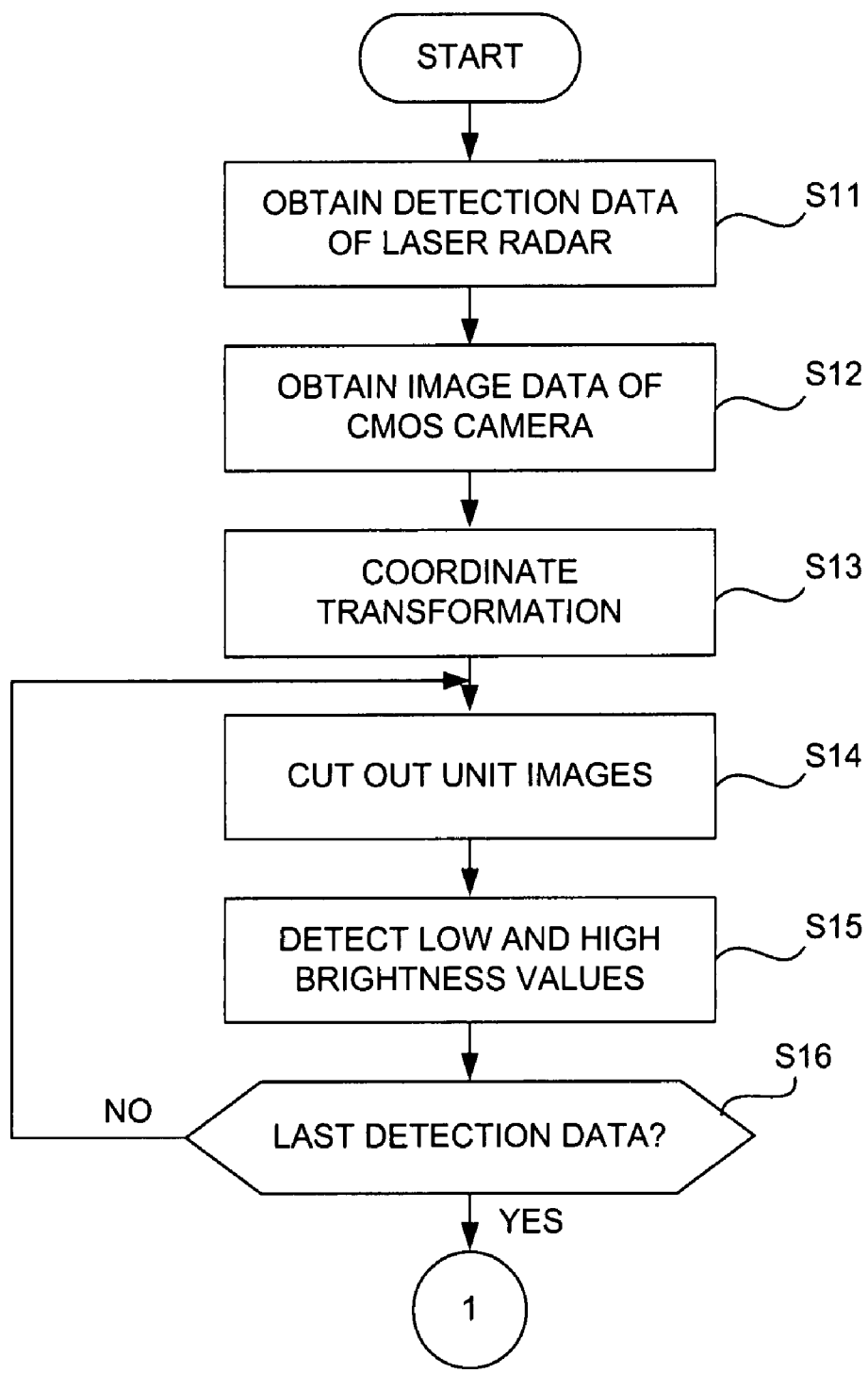
FIGS. 3, 4 and 5 are a schematic flowchart of the software resource executed by the detector 4.
Figure 4:
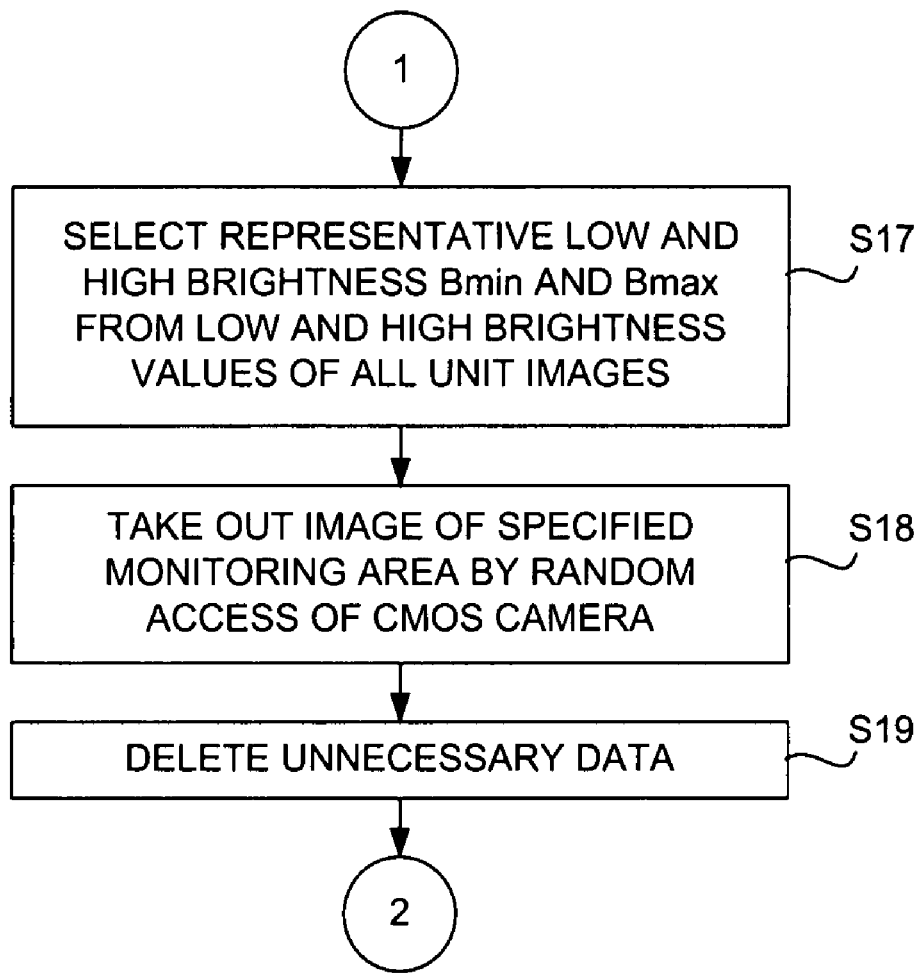
Figure 5:
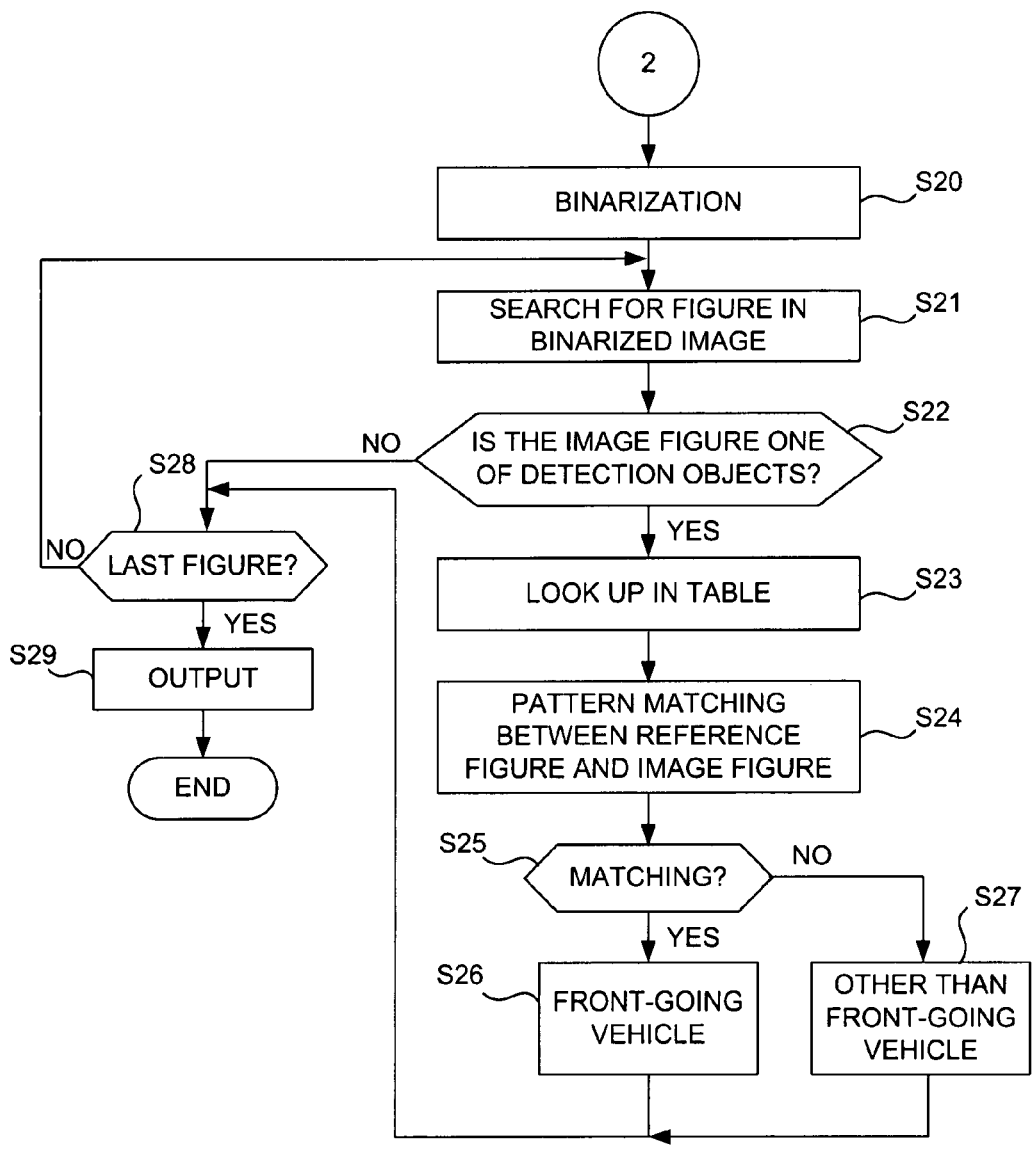

FIGS. 3, 4 and 5 show a schematic flowchart of the software resources executed by the detector 4. In the flowchart, detection data by the laser radar 2 (data on positions and distances of objects inside the monitoring area) and image data by the CMOS camera 3 (image data of the entire screen at this stage) are initially obtained (Steps S11 and S12). Examples of the image data and the detection data are shown in FIG. 6A and 6B. FIG. 6A shows an image 10 showing an example of the image data by the CMOS camera 3 (or image data provided by all effective pixels of the CMOS camera 3), including images of the lane 14 for the own vehicle 1 and the next lane 15 separated by white lane marks 11, 12 and 13, poles 16-20 for a guard rope on the left-hand side of one's own lane 14, a background 24 including a forest 21, mountains 22 and the sun 23 and vehicles 25-27 both in one's own lane 14 and the next lane 15. Of the vehicles 25-27 in the view, the one (25) in one's own lane 14 is the one of which the motion must be watched particularly carefully and will be hereinafter referred to as the front-going vehicle.

FIG. 6B shows black circular marks P1-P12 superposed on the image 10 of FIG. 6A, schematically indicating the detection data by the laser radar 2, P1-P5 representing the detection data on the poles 16-20 for the guard rope, P6 and P7 representing the detection data on the front-going vehicle 25, and P8-P12 representing the detection data on the vehicles 26 and 27 in the next lane 15. Explained more precisely, Pl-P12 actually represent the detection data on the reflective board or reflective tape attached to the poles 16-20 and the vehicles 25-27.

Although FIG. 6B shows the detection data P1-P12 superposed on the image 10, it is necessary to convert the coordinates of the detection data or the image data to those of the other because the coordinates of the laser radar 2 and those of the CMOS camera 3 are not the same and correspondence should be taken between these two sets of data (Step S13). The superposed representation in FIG. 6B is therefore the result after such a coordinate conversion has been carried out.

After this coordinate conversion has been carried out, a specified portion of this image 10 based on the detection data P1-P12 is cut out (Step S14). This process has nothing to do with the random access of the CMOS camera 3. Since the image 10 is already "spread out" in the RAM 4c, this cutout process can be carried out merely by reading out a desired range of addresses from the RAM 4c to cut out a desired portion of the image 10.

Figure 7A:
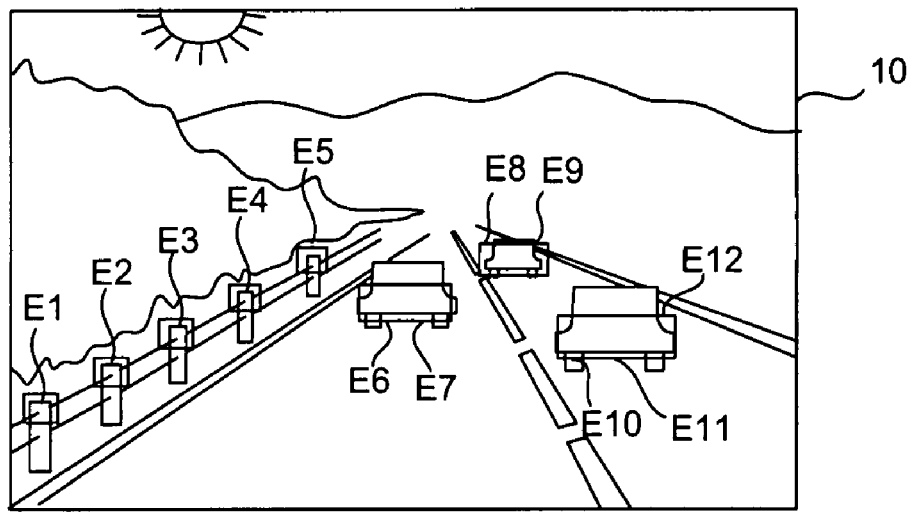
FIG. 7A is a drawing for explaining the concept of cutting out portions of the image of FIG. 6A

FIG. 7A is for explaining the concept of cutting out portions of the image 10. In FIG. 7A, small rectangles E1-E12 each indicate an area to be cut out, being drawn out with one of the detection data P1-P12 at the center, and the portions surrounded by these rectangles E1-E12 are cut out of the image 10 spread out in the RAM 4c. In this example, rectangles E1-E5 correspond to the detection data P1-P5 for the poles 16-20 and the cut out images (hereinafter referred to as unit images) using the rectangles E1-E5 include the image data of the neighborhoods of the top parts of the poles 16-20. Similarly, rectangles E6-E12 correspond to the detection data P6-P12 of the vehicles 25-27 in the own lane 14 and the next lane 15 and the unit images cut out by using these rectangles E6-E12 contain the image data of the back parts of these vehicles 25-27.

After unit images are thus cut out, a low brightness value and a high brightness value of each unit image are detected (Step S15). Each pixel in each unit image has a brightness value associated with it. The low brightness value of a unit image is the lowest of the brightness values of the pixels in the unit image, and the high brightness value is the highest of the brightness values of the pixels in the unit image. After high and low brightness values of all pixels are detected (YES in Step S16), comparisons are made among the high and low brightness values and the lowest of the low brightness value and the highest of the high brightness values are selected and accepted as the representative low brightness value $B_{min}$ and the representative high brightness value $B_{max}$, respectively (Step S17).

Figure 8:
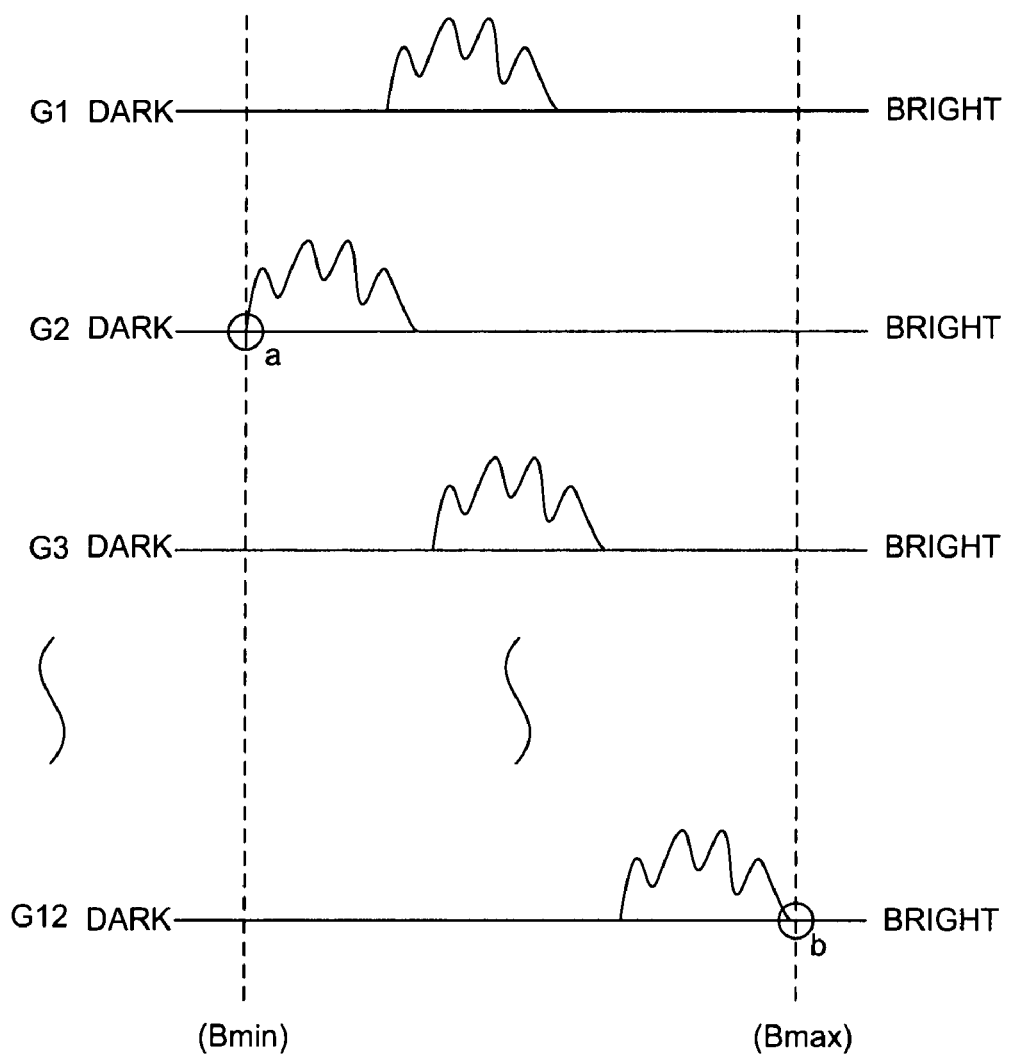
FIG. 8 is a graph showing an example of brightness distributions of unit images.

FIG. 8 is a graph showing an example of brightness distributions of unit images. In FIG. 8, G1-G12 each show a unit image cut out in Step S14 with the horizontal axis indicating the brightness increasing to the right. The wavy figures each represent the brightness distribution on the corresponding unit image. For example, the brightness of G1 and G3 is about medium but G2 has the brightness distributed on the darker side and G12 has the brightness distributed on the brighter side. Thus, in the case of this example, the representative low brightness $B_{min}$ is the low brightness value "a" of G2 and the representative high brightness $B_{max}$ is the high brightness value "b" of G12.

After the representative low brightness $B_{min}$ and the representative high brightness $B_{max}$ are thus determined, the image of an object portion of the monitoring area (hereinafter referred to as the object image) is taken out by a random access of the CMOS camera 3 (Step S18).

Figure 7B:
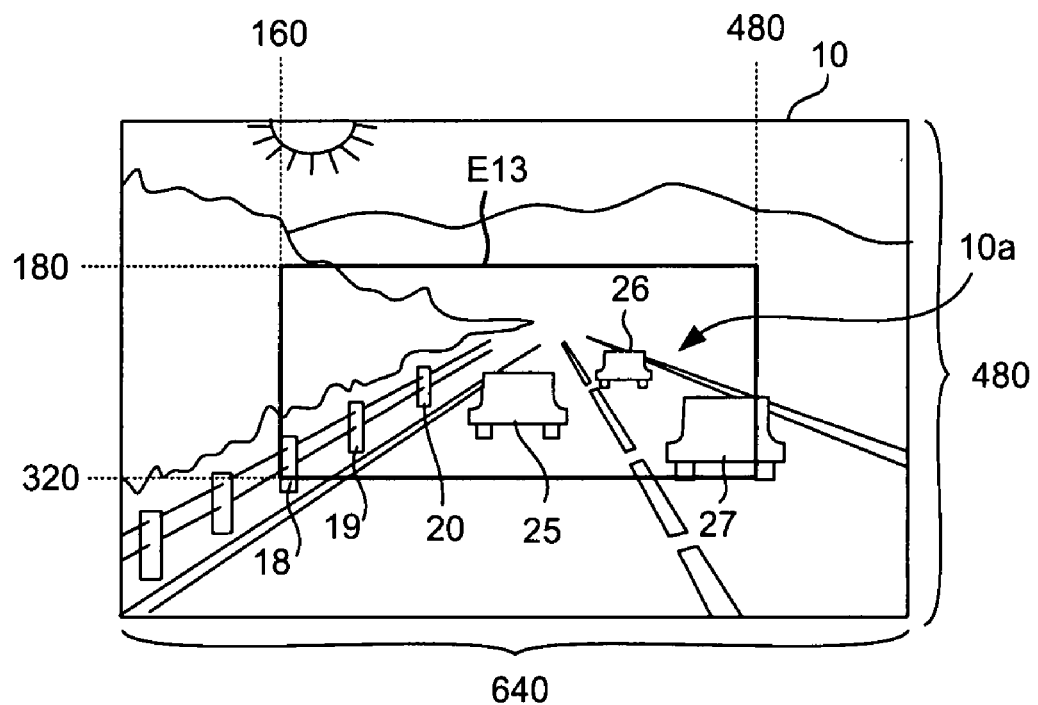
FIG. 7B is a drawing for explaining the concept of taking out an object image.

FIG. 7B is a conceptual drawing for showing this step of taking out an object image. In FIG. 7B, E13 indicates a rectangle drawn in the ranges of column addresses 160-320 and row addresses 160-480 (the image 10 as a whole having 640×480 pixels) to represent a "specified area" which is a random access area, and the image obtained by a random access to the CMOS camera 3 in this area of rectangle E13 is the aforementioned object image 10a. In other words, the object image 10a is the image in the specified area by providing the corresponding row addresses 160-320 and row addresses 160-480 to read out the pixel signals in these ranges of addresses.

Although FIG. 7B shows an example wherein the rectangle E13 for the specified area is nearly at the center of the total image, this is only for the sake of explanation. The position and size of the rectangle E13 may be varied according to the detection data of the laser radar 2 or the relative speed of the front-going vehicle may be taken into consideration in addition to the detection data of the laser radar 2 to change the position and size of the rectangle E13.

After the object image 10a has thus been taken out, a portion of the brightness data contained in the object image 10a (signals from within the rectangle E13) with brightness less than the representative low brightness $B_{min}$ and higher than the representative high brightness $B_{max}$ is discarded as unnecessary data in order to reduce the amount of bright data (Step S19).

Figure 9:
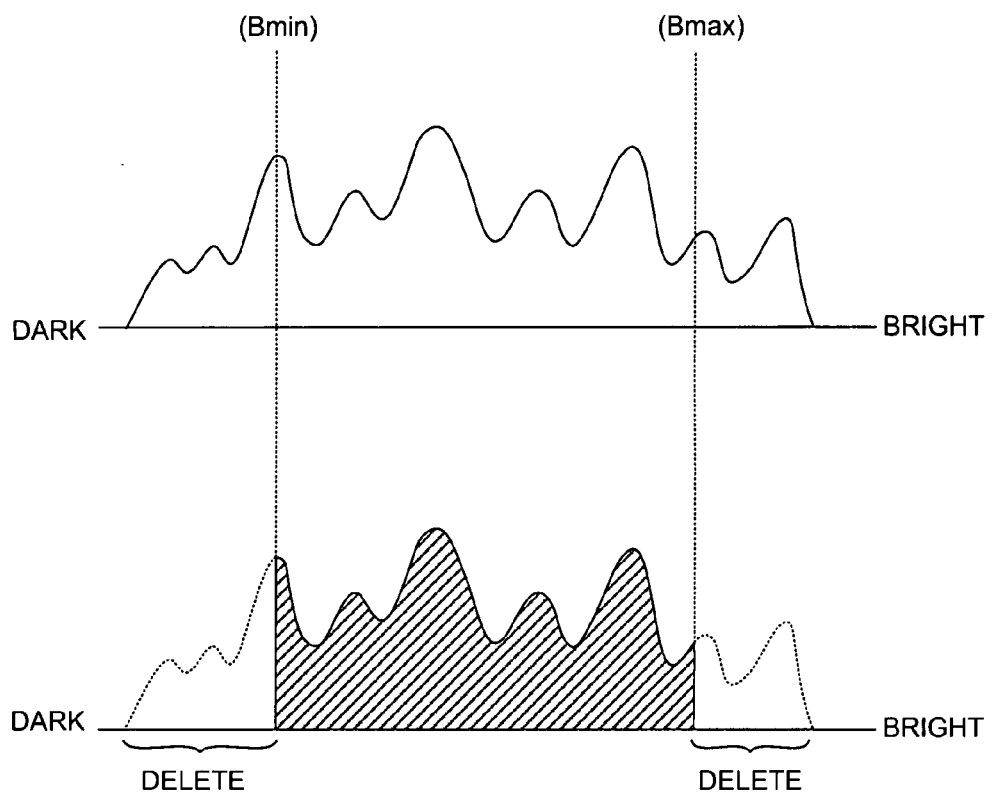
FIG. 9 is a graph showing the concept of the process of deleting unnecessary brightness data.

FIG. 9 shows the concept of this process of deleting unnecessary brightness data. In FIG. 9, the upper diagram shows a waveform before any portion is deleted, that is, the brightness distribution of the object image 10a before the deletion, including a wide range of brightness data corresponding to the high dynamic range of the CMOS camera 3 and hence containing a very large amount of data. The lower diagram shows a waveform after the unnecessary portion has been deleted, that is, after the portion with brightness less than the representative low brightness $B_{min}$ and higher than the representative high brightness $B_{max}$ has been deleted. The amount of brightness data contained in this distribution diagram is definitely less than that in the upper waveform.

After the unnecessary brightness data have thus been deleted, a series of processes which is an essential part of this invention is carried out for recognizing a front-going vehicle.

In this series of processes, a binarization process is carried out first (Step S20) to divide the object image 10a with reduced amount of brightness data into a white level and a black level and a search is made for a figure contained in the binary image thus obtained (Step S21).

In the above, "figure" means the figure of an object which is likely to be that of a front-going vehicle and in particular an assembly of black pixels within the binary image (hereinafter referred to as the image figure). In the object image 10a of FIG. 7B, for example, there are several objects such as the poles 18-20 for a guard rope and the vehicles 25-27. If the brightness of these figures is sufficiently different from that of the background, all or at least some of these objects appear as an assembly of black pixels as the result of the binarization process. In other words, these poles 18-20 and the vehicles 25-27 appear as image figures.

Next, it is determined whether or not each of these image figures is one of the detection objects of the laser radar 2 (Step S22). This determination can be done, for example, by matching with the black circles P1-P12 of FIG. 6B which conveniently represent the detection data of the laser radar 2, as explained above. Thus, if the coordinates of any of these black circles P1-P12 are included in the range of coordinates of an image figure, it is concluded that the image figure is one of the detection objects of the laser radar 2. If not, it is concluded that the image figure is not any of the detection objects of the laser radar 2.

Figure 10:
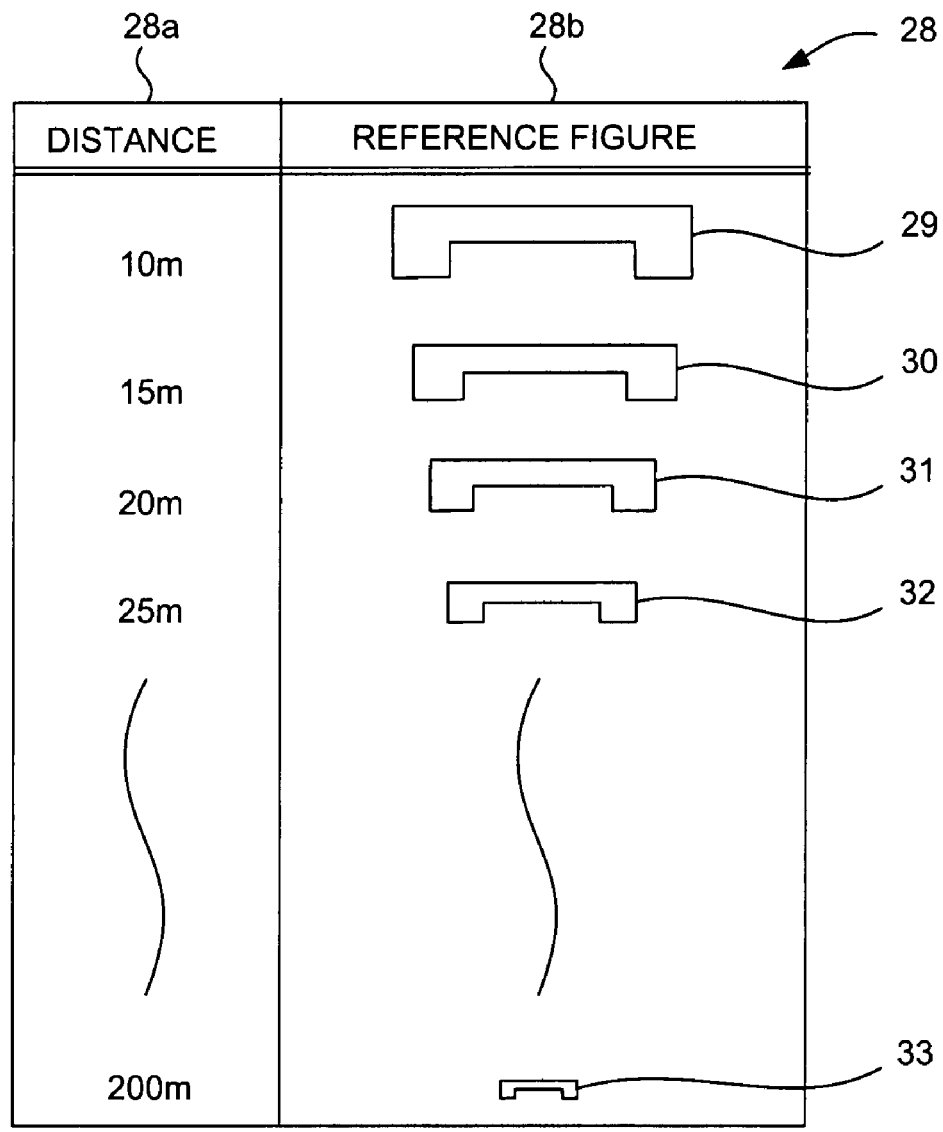
FIG. 10 is an example of reference table used according to this invention.

When an image figure is determined to be a detection object of the laser radar 2, a reference figure with the size matching the distance to this detection object is looked up in a reference table 28 as shown in FIG. 10 (Step S23).

The reference table 28 is preliminarily registered in the ROM 4B including a distance field 28a and a reference figure field 28b and containing many records. The distance field 28a stores distance data such as 10 m, 15 m, 20 m, . . . 200 m. The reference figure field 28b stores reference FIGS. 29-33 corresponding to respective distances. It goes without saying, however, that the distances and the figures illustrated in FIG. 10 are mere examples.

In the illustrated example, the reference figures are of a shape with a horizontally elongated part and downward protrusions at both ends of the horizontal part (sometimes referred to as the pi-shaped figure or the π-shaped figure), intended by the present inventor to resemble the back view of a vehicle in front of the own vehicle 1. The size (horizontal dimension) of the horizontal part of the pi-shaped figure is made smaller as the corresponding distance is greater because the front-going vehicle looks smaller as its distance from the own vehicle increases.

The important point of the algorithm for recognizing a front-going vehicle according to this invention is to carry out a pattern matching between the reference figures in the table and the image figures (Step S24) and to check the result (Step S25). If there is a matching (complete matching or matching over a specified percentage) (YES in Step S25), this image figure is concluded to be that of a front-running vehicle (Step S26). If there is no matching (NO in Step S25), it is concluded that this image figure is a figure of some other object (Step S27).

In the example of FIG. 7B, this object image 10a contains many objects detected by the laser radar 2 but only the vehicle 25 in one's own lane and the vehicle 26 in the next lane have an object image of a pi-shaped figure. The vehicle 27 in the next lane does not have an object image of a pi-shaped figure because its right-hand side is outside the rectangle E13 and hence there is no matching with the table figure.

Thus, only the images of these two vehicles 25 and 26 are judged to be that of a front-going vehicle in this example. Strictly speaking, only a vehicle running in one's own lane can be a front-running vehicle and hence the vehicle 26 in the next lane should not be identified as a front-running vehicle. In such a case, the white lines separating the traffic lanes should be recognized. Since already many technologies are available for recognizing white traffic lines such as Japanese Patent Publication Koho 3,270,293, no explanation will be added herein.

Steps S21-S27 are repeated for each of the image figures contained in the object image 10a. After this series of processes is completed with all of the image figures (YES in Step S28), the figure recognized as that of a front-running vehicle is outputted to a cruise control system (Step 29).

Figure 11A:
FIG. 11A is an example of image of a monitoring area in front of one's own vehicle taken by a CMOS camera and FIG. 11B is a simplified drawing for explaining the image of FIG. 11A.
Figure 11B:
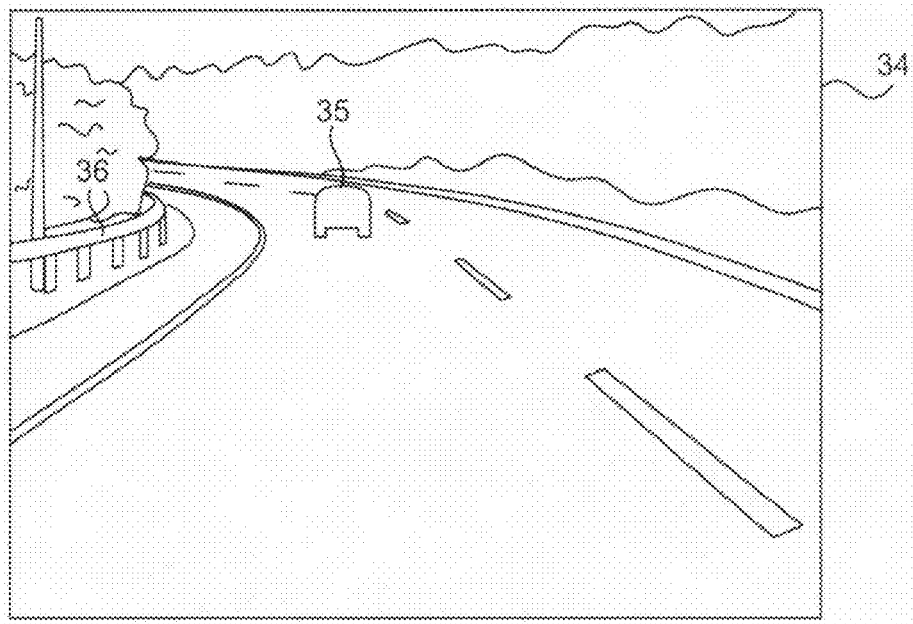

FIG. 11A shows an image 34 of an example of monitoring area in front of the own vehicle 1 taken by the CMOS camera 3. This image 34, as indicated in FIG. 11B, includes the image of a vehicle 35 running in front in the same lane and the background 36.

Figure 12A:
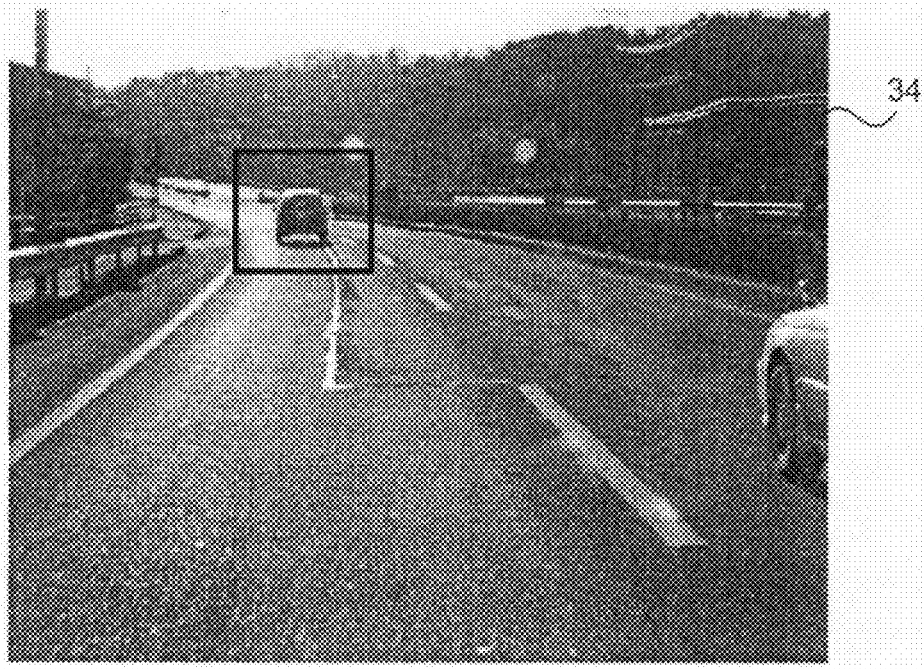
FIG. 12A is the image of FIG. 11A with a frame indicating a vehicle in front and FIG. 12B is a simplified drawing for showing the image inside the frame of FIG. 12A.
Figure 12B:
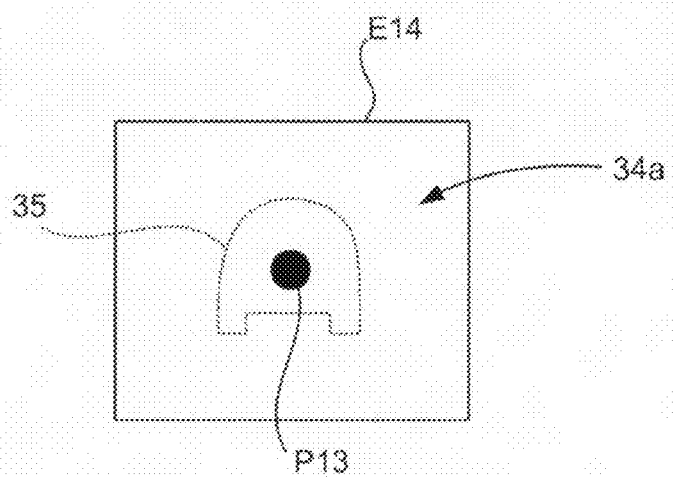

FIG. 12B shows an image 34a centered around the front-going vehicle 35 obtained by detecting the front-going vehicle 35 by the laser radar 2, setting a rectangle E14 around its detection position P13 and taking this portion out of the image 34 of FIG. 11A as shown in FIG. 12A by random access of CMOS camera 3.

Figure 13A:
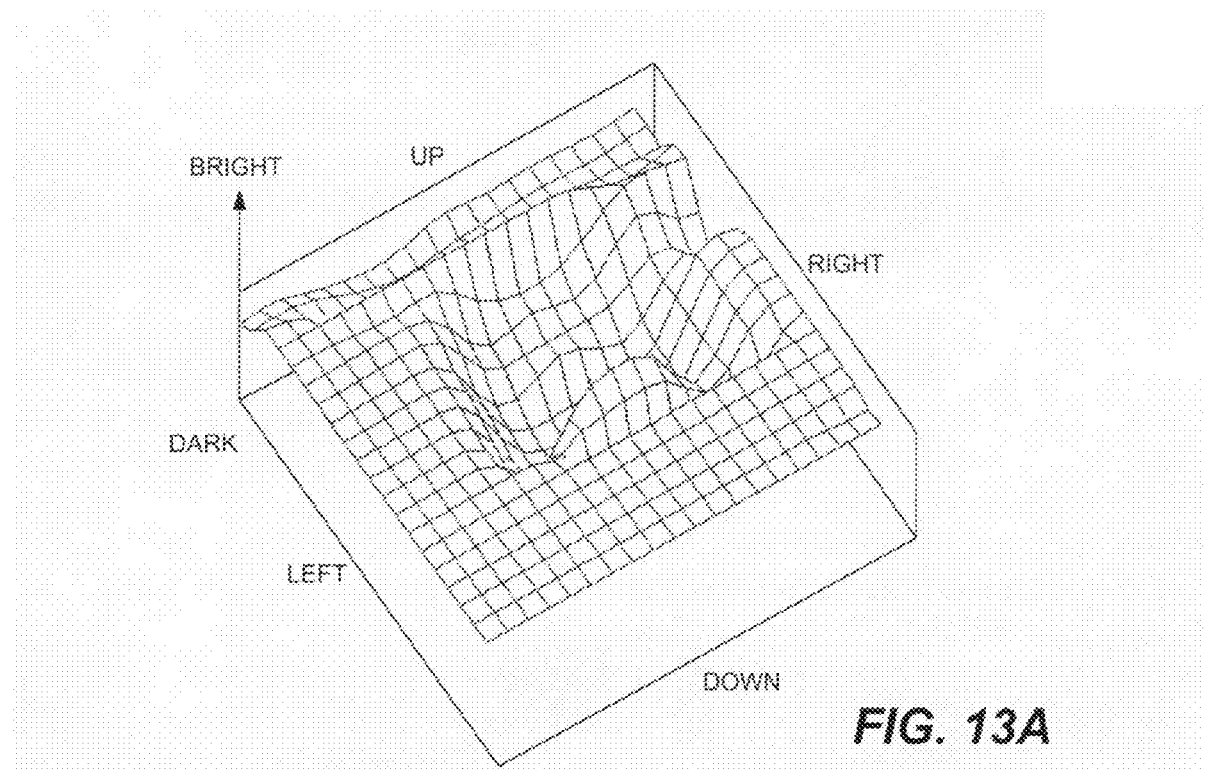
FIG. 13A is a three-dimensional graph for showing brightness distribution.

FIG. 13A is a three-dimensional representation of the brightness distribution on the image 34a, the vertical axis representing brightness and the indentation on the graph indicating a dark area in the image.

Figure 13B:
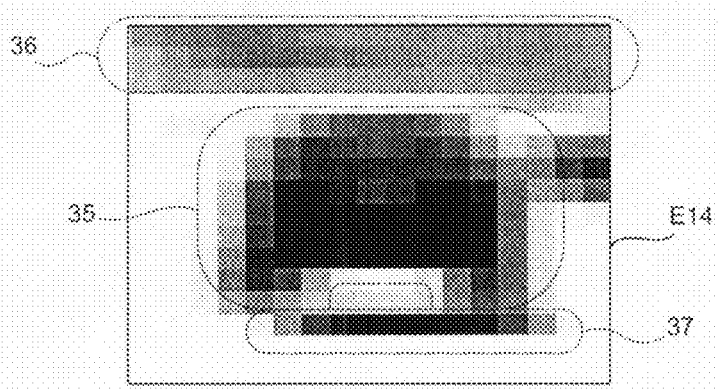
FIG. 13B is an enlarged image of a portion of the image of FIG. 12.

FIG. 13B shows a portion of the enlarged image 34a in particular around the indentation of FIG. 13A. This enlarged image is formed of many lattice points corresponding to the size of the pixels representing not only the front-going vehicle 35 but also the background 36 and the shadow 37 of the front-going vehicle 35. Although there are differences in the darkness among the lattice points, it can be ascertained that black and nearly black pixels are assembled in the part of the front-going vehicle 35 and one can note a certain peculiar manner in which they are assembled.

Figure 13C:
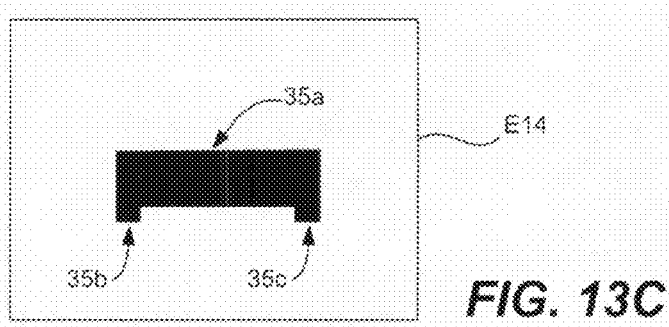
FIG. 13C is its binary image.

FIG. 13C is a binarized result of the image of FIG. 13B such that the part corresponding to the front-going vehicle 35 is particularly emphasized, appearing to have a horizontally elongated part and protruding parts protruding downward from both end portions of this horizontal part. In other words, this has the peculiar characteristic of a pi-shaped figure.

In summary, the front-going vehicle 35 with a peculiar pi-shaped figure can be recognized with high accuracy by means of this matching process between the binary image and the stored reference FIGS. 29-33. Even if a vehicle in the next lane changes its direction of travel due to a curve in the road and shows its side, its side view is usually not a pi-shaped figure of the type stored in the table 28 and hence no matching with the reference FIGS. 29-33 will be found.

Thus, according to this invention, not only objects other than vehicles but also even vehicles in adjacent lanes are not likely to be mistaken as a front-running vehicle in the same lane as one's own lane.

What is claimed is:

1. A vehicle detection apparatus for using a camera image from a camera for monitoring the front of one's own vehicle and detection data from a radar for detecting position of an object in front of said own vehicle and distance to said object from said own vehicle to recognize a front-going vehicle among photographed objects; said vehicle detection apparatus comprising:

a memory;
registering means for preliminarily registering in said memory reference images each with a size corresponding to the distance to said object, each of said reference images having a horizontally elongated part with downward protrusions that protrude only downward from both end parts of said horizontally elongated part and having no upward protrusions that protrude upward from said horizontally elongated part;
image extracting means for extracting images in a specified area inside said camera image centered around positions of objects in the detection data from said radar;
binarization means for binarizing the extracted images by said image extracting means;
matching means for matching patterns between an image figure contained in the binarized image and said reference images to look up one of said reference images with a size matching a detected distance; and
judging means for judging an image figure as a figure of a front-going vehicle if said matching means concludes that said image figure matches one of said reference images over a specified percentage.

2. A method of using a camera image from a camera for monitoring the front of one's own vehicle and detection data from a radar for detecting position of an object in front of said own vehicle and distance to said object from said own vehicle to recognize a front-going vehicle among photographed objects, said method comprising the steps of:

using a processor to perform the steps of:
preliminarily registering in a memory a plurality of reference images each with a size corresponding to the distance to said object, each of said reference images having a horizontally elongated part with downward protrusions that protrude only downward from both end parts of said horizontally elongated part and having no upward protrusions that protrude upward from said horizontally elongated part;

extracting images in a specified area inside said camera image centered around positions of objects in the detection data from said radar;

binarizing the extracted images;

matching patterns between an image figure contained in the binarized image and reference images to look up one of said reference images with a size matching a detected distance; and judging an image figure as a figure of a front-going vehicle if it is concluded by the step of matching that said image figure matches one of said reference images over a specified percentage.

3. The vehicle detection apparatus of claim 1 wherein said specified area is smaller than said camera image.

4. The method of claim 2 wherein said specified area is smaller than said camera image.

* * * * *